United States Patent [19]
Tanaka et al.

[11] Patent Number: 4,803,678
[45] Date of Patent: Feb. 7, 1989

[54] DISC CARTRIDGE

[75] Inventors: Kimio Tanaka; Haruo Shiba, both of Nagano, Japan

[73] Assignee: TDK Corporation, Japan

[21] Appl. No.: 942,495

[22] Filed: Dec. 16, 1986

[30] Foreign Application Priority Data

Dec. 18, 1985 [JP] Japan .................................. 60-194560

[51] Int. Cl.$^4$ .......................................... G11B 23/03
[52] U.S. Cl. ..................................... 369/291; 360/133; 206/312; 206/444
[58] Field of Search ............... 369/291, 77.2; 360/133; 206/312, 444

[56] References Cited

U.S. PATENT DOCUMENTS 4,688,206 8/1987 Nakagawa et al. ................. 369/291

4,707,821 11/1987 Verhagen .......................... 379/77.2

FOREIGN PATENT DOCUMENTS 137965 4/1985 European Pat. Off. ............ 360/133

Primary Examiner—Steven L. Stephan
Attorney, Agent, or Firm—Steinberg & Raskin

[57] ABSTRACT

A disc cartridge capable of preventing a recording surface section of a disc from being contacted directly by a casing to keep the disc housed in the casing at a safe state. The disc cartridge includes a pair of disc receivers each of which has a receiver body arranged so as to be approachable to the disc and formed into a sideways U-shape so as to define therein a recess for selectively receiving therein a part of a peripheral portion of the disc.

13 Claims, 4 Drawing Sheets

DISC CARTRIDGE

BACKGROUND OF THE INVENTION

This invention relates to a disc cartridge, and more particularly to a disc cartridge which has a hard disc, particularly, a double-sided type hard disc housed in a casing.

In general, a disc-type data recording carrier such as a compact disc (CD), a video disc (LD) or the like is used in a manner to be removed from a packing case and set in a recording and/or reproducing equipment.

Conventionally, it has been desirable to protect such a disc type recording carrier from the environment because it is not only easy to become covered with dust and damaged but also adversely affected due to a variation in temperature. For this purpose, the use of an envelope such as a tray, a casing or the like has been proposed to protect the disc. Unfortunately, such a conventional envelope is not suitable for the protection of a double-sided hard disc, because the the housing of the disc in a storage spaced defined in the envelope causes the disc to be contacted by the envelope. Also, the envelope causes the disc to be contacted by an inner surface thereof during the storage or transportation. Thus, the use of the envelope results in damage and/or pollution of the disc as well as the exposure of the disc to a variation in temperature.

Accordingly, it would be highly desirable to develop a disc cartridge which is capable of safely housing a disc in a casing so as to prevent a recording surface section of the disc from being contacted by the casing.

SUMMARY OF THE INVENTION

Briefly speaking, in accordance with the present invention, a disc cartridge is provided. The disc cartridge includes a casing comprising an upper cover plate and a lower cover plate joined together, in which a disc is rotatably housed. Also, the disc cartridge includes a shutter arranged to operate at least a window provided at the casing to insert a recording and/or reproducing head therethrough into the disc cartridge. The casing is provided therein with a pair of actuators each of which is adapted to releasably lock the shutter. The disc cartridge also includes a disc receiver which is arranged in the casing and operatively connected to each of the actuators to selectively receive therein a part of a peripheral portion of the disc. The actuator is arranged to be slidable in a longitudinal direction of the disc cartridge to cause the disc receiver to be approachably moved with respect to the disc. The disc receiver is formed at a portion thereof approachable to the disc into a sideways U-shape so as to define therein a sideways recess which selectively receives a part of a peripheral portion of the disc. The disc receiver is pivotally arranged in the casing. In a preferred embodiment, the sideways U-shaped portion of the disc receiver constitutes a receiver body.

Accordingly, it is an object of the present invention to provide a disc cartridge which is capable of safely housing a disc in a casing without damaging the disc.

It is another object of the present invention to provide a disc cartridge which is capable of constantly keeping a disc housed in a casing at a safe state.

It is a further object of the present invention to provide a disc cartridge which is capable of effectively preventing a recording surface section of a disc from being contacted directly with the casing.

It is still another object of the present invention to provide a disc cartridge which is capable of holding a disc at a state of floating in a space defined in a casing when the driving operation of the disc cartridge is not carried out.

It is yet another object of the present invention to provide a disc cartridge which is capable of preventing the unsteadiness of a disc in a casing.

It is still a further object of the present invention to provide a disc cartridge which is accomplishing the above-noted objects with a simple structure.

Still other objects and advantages of the invention will be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which like reference numerals designate like or corresponding parts throughout; wherein.

DETAILED DESCRIPTION OF THE PREFERRED EMBODIMENT

Now, a disc cartridge according to the present invention will be described hereinafter with reference to the accompanying drawings.

Figure 1:
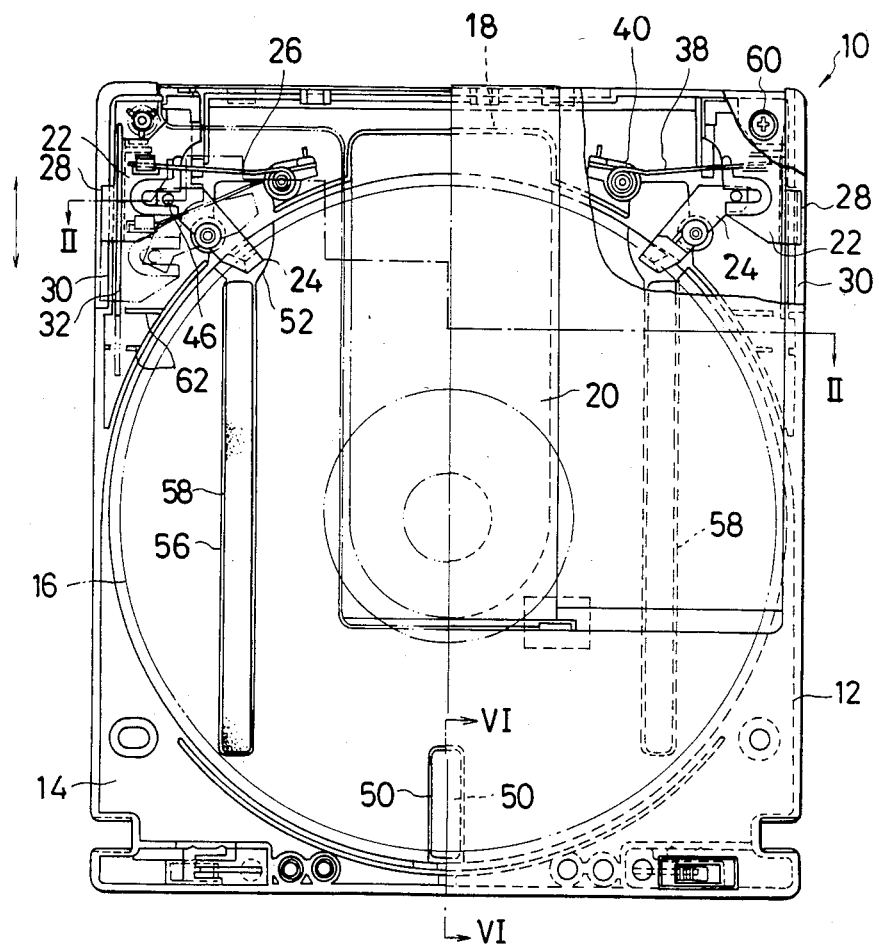
FIG. 1 is a partly cutaway plan view showing an embodiment of a disc cartridge according to the present invention.

FIG. 1 shows an embodiment of a disc cartridge according to the present invention.

Figure 2:
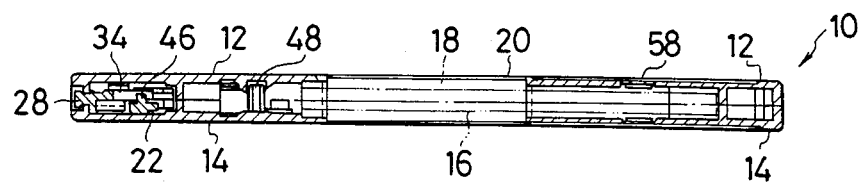
FIG. 2 is a sectional view taken along line II—II of FIG. 1.
Figure 3:
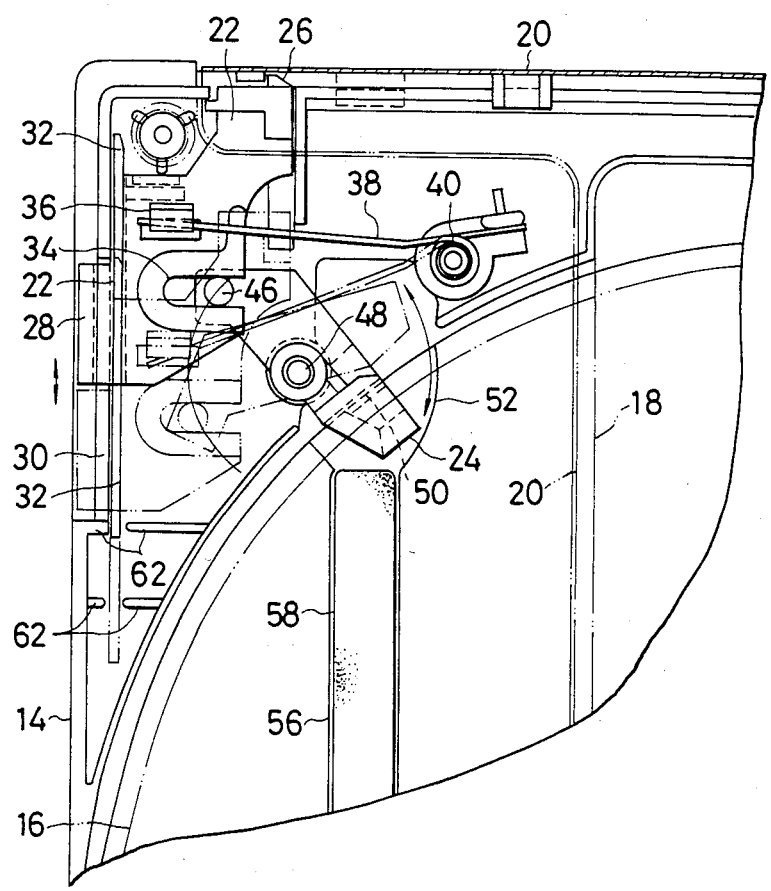
FIG. 3 is partly enlarged view showing an actuating section of the disc cartridge shown in FIG. 1.

A disc cartridge of the illustrated embodiment, as shown in FIGS. 1 to 3, includes a casing 10 comprising an upper cover plate 12 and a lower cover plate 14 joined together so as to define a space therein, and a disc 16 received or housed in the space of the casing 10. The casing 10 is formed with at least a window 18 for inserting a disc driving mechanism of a disc player (not shown) therethrough into the casing 10. The window 18 is operated by a shutter 20. Also, the disc cartridge includes a pair of actuators 22 arranged in the casing 10 for releasably locking the shutter 20 and a disc receiver 24 provided in the casing 10 and operatively connected to or engaged with each of the actuators 22. The disc receiver 24 is adapted to selectively receive a part of a peripheral portion of the disc 16 or a part of each of upper and lower surfaces and a peripheral end surface of the disc 16. The actuator 22 is arranged to be slidable in a longitudinal direction of the cartridge indicated by arrows in FIGS. 1 and 3, and the disc receiver 24 is adapted to be approachably moved with respect to the disc 16 when the actuator 22 is slidably moved. So that when the shutter 20 is actuated to close the window 18, the disc receiver 24 may be engaged with the disc 16 or insert therein a part of the disc to force it toward a rear end of the casing 10 while holding it at substantially a center of the casing in a width direction of the casing, to thereby keep it at a state of floating in the above-described space of the casing 10, whereas when the shutter 20 is actuated to open the window 18, the disc receiver 24 is disengaged from the disc 16 to prepare the disc for engagement with a disc driving mechanism of a disc player such as a recording and/or reproducing head which is then inserted through the opened window into the cartridge.

In the illustrated embodiment, the shutter 20 comprises a plate member which is formed into a substantially U-shape and movably fitted on the casing 10 so as to be slidable along the upper and lower cover plates 12 and 14.

A pair of the actuators 22, as shown in FIG. 1 are formed to be symmetrical with each other and arranged adjacent to both sides of a front portion of the casing 10 in a manner to be not only opposite to each other but symmetrical along a longitudinal axis of the cartridge and slidable with respect to the casing 10. Also, the actuators 22 each serves as an actuating lever to actuate operation sections of the disc cartridge. More particularly, each of the actuators 22, as shown in FIG. 3, is provided at a front end thereof with lock means 26, which comprise, in the illustrated embodiment, a hook-like member integrally formed at a front end of the actuator 22 and is securely engaged with the shutter 20. The actuator 20 is also provided on one side or an outer side thereof with actuating means 28 which comprise, in the illustrated embodiment, a projection integrally formed on the outer side of the actuator and outwardly extending through a horizontally extending cutout or slot 30 formed at a side wall of the casing 10. Also, the actuator 22 has cover means 32 integrally provided on the one side thereof so as to extend in a longitudinal direction thereof. The cover means 32 are formed to thoroughly cover the cutout 30 formed at the side wall of the casing 10 in a selected manner to function as a dust protective cover for preventing any foreign matter such as dust or the like from entering the casing 10 through the cutout 30. In addition, the actuator 22 is formed on the other side or an inner side thereof with a guide groove 34 of a substantially U-shape which serves as a movement transmission means for transmitting sliding movement of the actuator to the disc receiver 24 as described hereinafter. Further, the actuator 22 is provided on an upper surface thereof with a spring bearing member 36 as shown in FIG. 3 which is engaged with one end of a spring 38 held at the other end thereof on a spring holder 40 fixed on the casing 10, so that the actuator may be constantly forced toward a front end of the casing.

Figure 4:
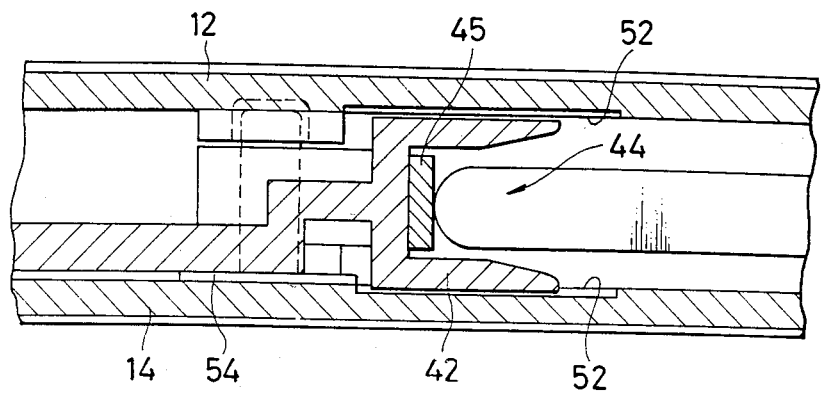
FIG. 4 is a fragmentary sectional view showing a receiver body of a disc receiver.

A pair of the disc receivers 24, as shown in FIG. 1, are also formed in a manner to be symmetrical with each other. Each of the disc receivers 24 is generally formed into a liver-like shape as shown in FIGS. 1 and 3 and provided at one end thereof with a portion approachable to the disc to selectively receive a part of a peripheral portion of the disc when the disc receiver is actuated by the actuator. In the illustrated embodiment, the portion is constituted by a receiver body 42. The receiver body 42 is formed into a substantially sideways U-shape to define therein a sideways recess designated by reference numeral 44 in FIG. 4. The recess 44 may have an elastic member applied to an end surface thereof contacting with the peripheral portion of the disc, as indicated at reference numeral 45. Such construction effectively prevents unsteadiness and/or damage of the disc in the disc receiver 24. The elastic member 45 may be formed of rubber or a soft plastic material such as polyethylene, polypropylene or vinyl chloride. Such an elastic member may be arranged on upper and lower surfaces of the recess 44 of the receiver body 42. The recess 44 of the receiver body 42 is preferably formed in a manner such that an opened end portion or inlet portion thereof is vertically enlarged so as to facilitate the insertion and removal of a disc 16 with respect to the recess 44.

Figure 5:
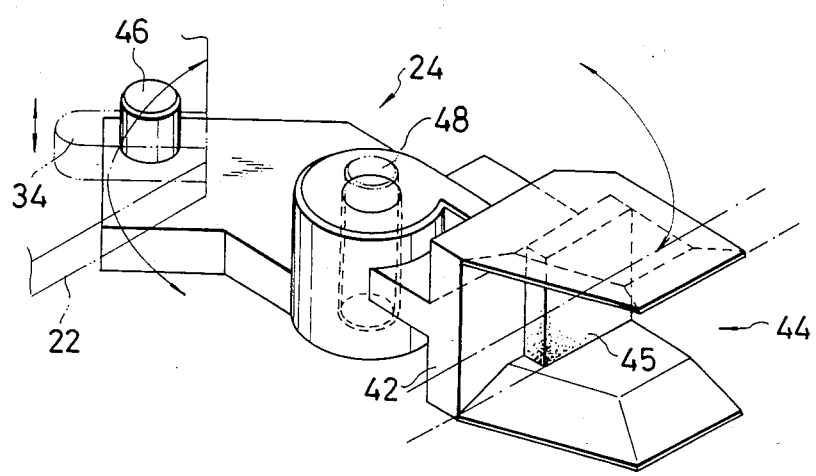
FIG. 5 is a perspective view showing a disc receiver.

The so-formed receiver body 42 is positioned adjacent to a peripheral portion of the disc 16 to selectively receive a part of the peripheral portion of the disc 16 in the recess depending upon the sliding movement of the actuator as shown in FIGS. 1 and 3 and also act as an elevator for lifting the disc 16. More particularly, the disc receiver 24, as best seen in FIG. 5, is also provided at the other end thereof with a guide pin 46 acting as operative connection means, which is loosely fitted in the guide groove 34 of the actuator 22 to operatively connect the disc receiver 24 in the actuator 22. The disc receiver 24 is movably supported at a middle portion thereof on a pivot pin 48 so as to be rotatable about the pin 48 and vertically movable along the pin 48.

In the illustrated embodiment, the guide pin 46 is provided at the disc receiver 24 and the guide groove 34 is formed at the actuator 22. However, the guide pin 46 and guide groove 34 may be provided at the actuator 22 and disc receiver 24, respectively.

Also, in the illustrated embodiment, the spring 38 may comprise a coiled spring stretchably arranged in the sliding direction of the actuator 22 or between the disc receiver 24 operatively connected to the actuator 22 and the casing 10. Alternatively, it may comprise a coiled spring wound on the pivot pin 48 of the disc receiver 24. Each of such constructions causes the actuator 22 to be forced toward the front end of the casing 10.

Figure 6:
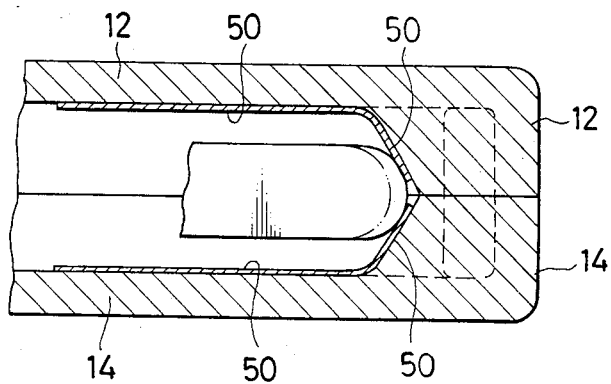
FIG. 6 is a sectional view taken along line VI—VI of FIG. 1.

Further, in the illustrated embodiment, the casing 10 is formed at a rear end of an interior thereof into a substantially sideways V-shape as shown in FIG. 6, so that the rear end may be tapered. Such construction facilitates the positioning of the disc 16 at the center of the casing 10 in a width direction of the casing because it is guided along the tapered rear end. Also, the casing 10 may have a disc holding member 50 applied to the tapered rear end hereof to ensure the safety and smooth operation of the disc in the casing 10. For this purpose, the disc holding member 50 is preferably formed of a material which is capable of exhibiting lubricating properties, such as ultra-high-molecular-weight polyethylene, ultra-high-molecular-weight polyethylene foam, PET, metal sheet such as stainless steel and the like. Such a material likewise may be applied to portions of the casing 10 adjacent to the tapered rear end as shown in FIG. 6.

The casing 10, as shown in FIG. 1, is formed on each of upper and lower surface sections of an inner surface thereof with a pair of recesses 52 so as to positionally correspond to the disc receivers 24. The recess 52 serves to ensure the smooth movement of the disc receiver. The disc receiver 24 is supported on a holder 54. Also, the bottom surface of the casing 10 is formed with a pair of elongated grooves 56, on each of which a sheet 58 exhibiting lubricating properties is sticked. Reference numerals 60 and 62 designate bolts and ribs, respectively.

Now, the manner of operation of the disc cartridge of the illustrated embodiment constructed as described above will be described hereinafter with reference to FIGS. 1 to 6.

When the disc cartridge is inserted in a disc player (not shown) for the operation, the actuating means or projection 28 of the actuator 22 projecting through the cutout 20 of each of the side plates of the casing 10 is engaged with a projection provided at an insertion port of the disc player to be rearwardly slided along the cutout 30 against the spring 38. The sliding of the projection 28 causes the shutter 20 to be released from the lock means or hook-like member 26, so that the shutter 20 may be moved in a direction of opening the window 18 by means of a shutter actuating mechanism of the disc player. Concurrently, the disc receiver 24 is pivotally moved about the pivot pin 48 due to the sliding of the actuator 22 to release the disc 16 from the recess 44, resulting in the disc 16 being safely supported on the lubricating sticked sheets 58 and then operatively engaged with a disc driving mechanism of the disc player.

When the disc cartridge is to be removed from the disc player, the disc 16 is first disengaged from the disc driving mechanism of the disc player to be put on the lubricating sticked sheets 58 and then the shutter 20 is moved by means of the shutter actuating mechanism of the disc player to close the window 18. Then, the disc cartridge is removed from the disc player, so that the actuator 22 may be slided toward the front end of the disc cartridge by means of the spring 38 to actuate the disc receiver 24, to thereby fit a part of the disc 16 in the receiver body 42. This results in the disc 16 being forced toward the rear end of the casing 10 while being held at a state of floating in the the space in the casing 10. Simultaneously, the lock means 26 of the actuator 22 actuates to keep the shutter 20 closed. In this instance, the disc 16 is safely held in the casing 10, because the outer periphery of the disc, as shown in FIG. 6, is constantly abutted against the sideways V-shaped end surface of the recess 44 of the receiver body 42.

As can be seen from the foregoing, the present invention is constructed in the manner that the disc receiver is pivotally moved in the casing and formed at a portion thereof approachable to the disc into a U-shape so as to define therein a sideways recess which selectively receives therein a part of the peripheral portion of the disc when the disc receiver is actuated. This causes the disc to be conveniently held by the disc receiver. Also, such construction allows only a recording surface section of the disc to be held by the disc receiver, to thereby keep the disc at a state of floating in the space of the casing. Thus, the disc housed in the casing is constantly kept at a safe state. Also, the application of an elastic member to the end surface of the recess of the disc receiver effectively prevents damage and unsteadiness of the disc.

It will thus be seen that the objects set forth above, among those made apparent from the preceding description, are effectively attained and, since certain changes may be made in the above construction without departing from the spirit and scope of the invention, it is intended that all matter contained in the above description or shown in the accompanying drawings shall be interpreted as illustrated and not in a limiting sense.

What is claimed is:

1. A disc cartridge, comprising:
   a casing comprising an upper cover plate and a lower cover plate joined together to define a space therein;
   a disc rotatably housed in said space of said casing;
   a shutter for operating at least one window provided in said casing to allow insertion of a disc driving mechanism therethrough into said disc cartridge;
   actuator means arranged in said casing and engaged with said shutter to releasably lock said shutter; and
   a disc receiver arranged in said casing and operatively connected to said actuator means to selectively receive therein a part of a peripheral portion of said disc;
   said disc receiver being formed at a portion thereof approachable to said disc into a sideways U-shape so as to define therein a recess which selectively receives a part of said peripheral portion of said disc therein due to movement of said actuator means.

2. A disc cartridge as defined in claim 1, wherein said disc receiver is pivotally arranged in said casing.

3. A disc cartridge as defined in claim 1, wherein said recess has an elastic member applied to a surface thereof contacting with said peripheral portion of said disc.

4. A disc cartridge as defined in claim 3, wherein said elastic member is formed of a soft plastic material.

5. A disc cartridge as defined in claim 4, wherein said soft plastic material is selected from the group consisting of polyethylene, polypropylene and vinyl chloride.

6. A disc cartridge as defined in claim 3, wherein said elastic member is formed of rubber.

7. The cartridge of claim 2, comprising a pair of disc receivers pivotally mounted in said casing, 8. The cartridge of claim 7, wherein said actuating means comprise
   a pair of actuators slidably arranged in said casing along respective edges thereof,
   at least one of said actuators comprising means for locking said shutter,
   each said actuator comprising a projection extending through a slot formed in a respective edge of said casing and a cover formed and positioned to entirely cover said respective slot and prevent contaminants from entering said casing,
   with one of a respective actuator and disc receiver comprising a groove or a pin seated in said groove, and the other of said respective actuator and disc receiver comprising said pin or said groove which form said operative connection,
   whereby sliding said respective actuators pivot said respective disc receivers to receive or release said disc.

9. The cartridge of claim 8, wherein each said disc receiver is pivotally mounted on a pivot pin positioned between said recess portion thereof and an end at which said pin or groove is positioned.

10. The cartridge of claim 9, wherein said respective actuator comprises said groove and said respective disc receiver comprises said pin.

11. The cartridge of claim 8, additionally comprising a spring bearing member on each said actuator,
two spring holders on said casing, and
two springs, each mounted on a respective spring holder and positioned on a respective spring bearing member.

12. The cartridge of claim 8, wherein an end of said casing between said edges and away from said disc receivers is formed into a substantially sideways V-shape.

13. The cartridge of claim 8, wherein inner surfaces of said upper and lower plates are each formed with a pair of recesses to positionally correspond to said respective disc receivers.

* * * * *